US006962513B2

(12) United States Patent
Kimata et al.

(10) Patent No.: US 6,962,513 B2
(45) Date of Patent: Nov. 8, 2005

(54) OUTBOARD MOTOR

(75) Inventors: Ryuichi Kimata, Saitama (JP); Kousei Yamashita, Saitama (JP); Hironori Katou, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/665,274

(22) Filed: Sep. 22, 2003

(65) Prior Publication Data

US 2004/0058594 A1    Mar. 25, 2004

(30) Foreign Application Priority Data

Sep. 19, 2002 (JP) ........................... P2002-273306
Sep. 19, 2002 (JP) ........................... P2002-273307
Dec. 19, 2002 (JP) ........................... P2002-368070

(51) Int. Cl.[7] ............................................. B63H 20/00
(52) U.S. Cl. ........................... 440/2; 440/77; 440/900; 701/21; 701/29
(58) Field of Search ........................... 440/1, 2, 76, 77, 440/78, 84, 900; 123/190 C, 190 P; 340/825.69; 341/176; 701/2, 21, 29–35; 33/232

(56) References Cited

U.S. PATENT DOCUMENTS

| 4,587,935 | A | * | 5/1986 | Yamazaki .............. 123/198 R |
| 5,797,339 | A | * | 8/1998 | Moore et al. ............ 114/144 A |
| 5,992,368 | A | | 11/1999 | Okamoto |
| 6,054,831 | A | * | 4/2000 | Moore et al. ................ 318/581 |
| 6,377,879 | B2 | * | 4/2002 | Kanno .......................... 701/29 |
| 6,431,930 | B1 | * | 8/2002 | Holt ............................. 440/84 |
| 6,549,843 | B1 | * | 4/2003 | Koerner ...................... 701/104 |
| 6,647,769 | B1 | * | 11/2003 | Fujino et al. .............. 73/119 A |
| 6,671,611 | B1 | * | 12/2003 | Peltier ......................... 701/104 |
| 6,691,023 | B2 | * | 2/2004 | Fujino et al. ............... 701/114 |
| 6,757,606 | B1 | * | 6/2004 | Gonring ...................... 701/103 |
| 6,775,607 | B2 | * | 8/2004 | Koerner ...................... 701/104 |
| 6,836,539 | B2 | * | 12/2004 | Katou et al. ........... 379/106.01 |
| 6,872,106 | B2 | * | 3/2005 | Kanno ........................... 440/2 |
| 2003/0060946 | A1 | * | 3/2003 | Okuyama et al. ............. 701/21 |
| 2003/0060952 | A1 | * | 3/2003 | Kanno et al. ................. 701/29 |
| 2003/0074114 | A1 | * | 4/2003 | Okuyama et al. ............. 701/21 |
| 2003/0093196 | A1 | * | 5/2003 | Okuyama ..................... 701/21 |

FOREIGN PATENT DOCUMENTS

| CA | 2357699 A1 | * | 3/2002 | .......... B63H 20/08 |
| JP | 9-315272 | | 12/1997 | |
| JP | 2002244724 A | * | 8/2002 | .......... G05B 23/02 |
| JP | 2004013917 A | * | 1/2004 | .......... G05B 23/02 |

* cited by examiner

Primary Examiner—S. Joseph Morano
Assistant Examiner—Ajay Vasudeva
(74) Attorney, Agent, or Firm—Westerman, Hattori, Daniels & Adrian, LLP

(57) ABSTRACT

An operational condition of an outboard motor 1 is detected by an ECU 29, and transmitted via a communication unit 228, from a communication apparatus 283 to a base station 30. Antennas 32 and a cable 33 are arranged along an inner surface of an engine cover 12. The cable 33 is provided with a connector 34 for connecting the antenna 32 to a communication unit 28 and a GPS receiving circuit 31. The communication apparatus and the antennas are held floating in a case 351 which is filled with a gel, and the case 351 is fixed to the engine cover 12. A communication unit 28 is provided inside an engine cover 12. A housing portion 41 for a portable phone PH is provided pivoted about the cover 12 in such a manner that the portable phone is removable from the housing portion 41.

20 Claims, 7 Drawing Sheets

OUTBOARD MOTOR

BACKGROUND OF THE INVENTION

1. Field of the Invention

The present invention relates to an outboard motor, and particularly, to an outboard motor which comprises a radio communication apparatus capable of transmitting data such as an operational condition of the outboard motor and the like to the outside.

2. Description of the Related Art

For a vehicle such as an automobile, it is known to monitor an operational condition of the vehicle at a location away from the vehicle. For example, there is described in the Japanese Patent Application Laid-Open No. 9-315272 a vehicle which has a fault diagnosis device mounted thereon with a transmitter so as to transmit a diagnosis result to a base station. A vehicle with a transmitter mounted thereon transmits data to a base station by utilizing a radio-receiving antenna or a dedicated antenna that is jutted out from the vehicle.

For an outboard motor used for a boat, since it operates for a long time under severe conditions, it should be considered that information for appropriate maintenance is transmitted to a maintenance facility. For a small board, that is, a boat which utilizes an outboard motor, since the outboard motor is prepared independent of a boat and is attached to the boat hull, antennas and the like for transmission/reception are positioned at a location near the steering position, for example, in a cabin.

If a communication apparatus is mounted in an outboard motor itself, since the outboard motor is away from antennas and the like in a cabin, there occur many problems such as laborsome cable wiring, necessity to take measures against noise due to long cable wiring and the like. Particularly, since the outboard motor is used in combination with various kinds of hulls, they are required to be separately handled in view of the differences of cable wiring, routing, or the like, which results in expense of much time.

In addition, a rear portion of the boat is susceptible not only to vibrations of the outboard motor, but also to impact of the boat beaten by waves. Therefore, when a radio communication apparatus is mounted on an outboard motor positioned at the rear portion of the boat, due consideration must be given to these vibration and impact. Further, since the outboard motor is relatively small, it is not easy to obtain therein a space for the radio communication apparatus, the antenna, and the controller such as a CPU to be connected thereto.

SUMMARY OF THE INVENTION

It is an object of the present invention to provide an outboard motor with a communication apparatus mounted thereon, which saves time and efforts in cable wiring, is less sensitive to vibrations and impact, can be protected from noise and water, and eliminates need to consider a hull type on which the outboard motor is mounted.

A first feature of the present invention is that an outboard motor having a body which includes a propulsion unit and an internal combustion engine for driving the propulsion unit, and a cover for covering the internal combustion engine detachably, is configured in such a manner that a controller for controlling the above-mentioned internal combustion engine and a radio communication apparatus connected to the above-mentioned controller are housed inside of the above-mentioned cover, and an antenna of the above-mentioned radio communication apparatus is mounted on the outboard motor.

According to the first feature, since the radio communication apparatus and the antenna are arranged in the vicinity of the controller in the outboard motor, it is possible to shorten cable wiring or routing. Since positioning between the internal combustion engine and the antenna which may cause noise is fixed, it is possible to estimate noise effects and to take measures against noise in advance.

A second feature of the present invention is that the antenna is fixed to a surface of the cover. According to the second feature, since the antenna is fixed to a surface of the cover, it can resist vibrations of the outboard motor, though an antenna is susceptible to vibrations when it is protruding from the outboard motor.

A third feature of the present invention is that the antenna is arranged along a surface of the cover. According to the third feature, since the antenna is not protruding from the outboard motor nor wired in the air, it does not interfere with another component, thereby enhancing the handleability of the outboard motor.

A fourth feature of the present invention is that the cover is made of a resin and the antenna is attached to an inner surface of the cover. According to the fourth feature, since the antenna is provided so as not to be seen from the outside, the appearance of the outboard motor is not impaired and radio-wave signals can be received adequately. Besides, since the antenna is arranged at the inner surface of the cover, it can be protected from a severe use condition such as getting wet.

A fifth feature of the present invention is that a cable is provided extending from the above-mentioned antenna to the above-mentioned radio communication apparatus, and the cable is run along the surface of the above-mentioned cover. According to the fifth feature, the cable wiring does not interfere with another component, thereby enhancing the handleability of the outboard motor.

A sixth feature of the present invention is that the controller and the radio communication apparatus are mounted onto the body, and a connector is provided for connecting/disconnecting the radio communication apparatus and the antenna while the cover is detached from the body.

According to the sixth feature, the connector can be connected/disconnected while the cover is removed, thereby enhancing the usability. A combination of the body and the communication apparatus and a combination of the cover and the antenna can be handled separately, thus facilitating maintenance. Further, since cable wiring between the radio communication apparatus and the antenna is set sufficiently long, it is possible to accommodate a difference of vibrations between the communication apparatus and the antenna.

A seventh feature of the present invention is that the cover is made of a resin, and out of the controller, the radio communication apparatus and the antenna, at least the antenna is fixed to the inside of the cover via a shock absorber.

A eighth feature of the present invention is that the antenna is covered with a gel agent as a shock absorber.

According to the seventh and eighth features, since an antenna is fixed to the inside of a cover and is not protruding from the outboard motor, its appearance is enhanced. Also, since the antenna is fixed via a shock absorber, it is insensitive to vibrations of the outboard motor. Further, since the controller and the radio communication apparatus are arranged in the vicinity of an antenna in the outboard motor it is possible to shorten cable wiring or routing. Since positioning between an internal combustion engine and an antenna which may cause noise, is fixed, it is possible to predict noise and take proactive measures against the noise. Particularly, according to the eighth feature, since the shock absorber is the gel agent, it is easy to cover the antenna thereby to add a shock absorbing effect.

A ninth feature of the present invention is that the container fixed in the cover is provided and the radio communication apparatus and the antenna is covered with the gel agent filled in the container.

A tenth feature of the present invention is that the controller is disposed in the container with entirely covered with the gel agent.

According to the ninth and tenth features, since the controller, the radio communication apparatus and the antenna are fixed floating inside the cover, it is possible to reduce effects of vibration and impact significantly.

An eleventh feature of the present invention is that the container is fixed to an inner surface of the cover, or the container is fixed to the engine.

According to the eleventh feature, since a cover and members fixed to the cover are handled separately from the internal combustion engine body and they are separated from the internal combustion engine body, it is possible to reduce a thermal effect of the internal combustion engine body. Moreover, since positioning of a controller, a communication unit and an antenna of the internal combustion engine is fixed, cable wiring is facilitated.

A twelfth feature of the present invention is that the apparatus comprises with a communication apparatus housing portion for inserting the radio communication apparatus into the cover in such a manner that the radio communication apparatus is accessible from an outside.

A thirteenth feature of the present invention is that the apparatus comprises with an operational condition detecting device for detecting an operational condition of the internal combustion engine, wherein the radio communication apparatus transmits to an outside an operational condition detected signal output from the operational condition detecting device.

According to the twelfth or thirteenth feature, in a boat which has no cabin or the like as an installation location of a communication apparatus, the communication apparatus can be housed inside the cover of the outboard motor. Since the communication apparatus and the operational condition detecting device are closely arranged, cable wiring or routing can be set extremely short. Accordingly, noise that is generated in the cable wiring or routing can be reduced. Since positioning of the communication apparatus and the internal combustion engine is fixed, only the outboard motor is needed to take measures against and recognize the noise.

Further, a fourteenth feature of the present invention is that the communication apparatus housing portion includes a lid portion which is a part of the cover and a holding member which is connected to the lid portion so as to be housed inside the cover, and the lid portion being retractably pivoted about the cover. Since the communication apparatus is housed in the holding member placed inside the cover and is covered with the lid portion which is integral with the cover, its appearance is simple, and it is possible to protect the communication apparatus from a severe use condition accompanied by water damage and the like.

A fifteenth feature of the present invention is that the communication apparatus housing portion is provided with a communication connector which is compatible with a connection terminal of the communication apparatus so as to connect the communication apparatus housed in the communication apparatus housing portion and the operational condition detecting device. According to the fifteenth feature, it is possible to insert the communication apparatus into the communication apparatus housing portion while the communication apparatus is connected to the operational condition detecting device.

Furthermore, a sixteenth feature of the present invention is that the holding member has a shock absorbing function for protecting the communication apparatus housed in the housing portion. The communication apparatus is covered with a cover which is, in spite of heavy vibrations of the outboard motor, relatively less susceptible to the vibrations and the communication apparatus is held by the holding member which has excellent shock absorbing effect.

A seventeenth feature of the present invention is that the cover and the lid portion of the communication apparatus housing portion are made of a resin. Since the cover and the lid portion are made of a readily formable resin, the appearance is enhanced. In addition, since an antenna can be entirely housed in the resin cover, the appearance is also improved and the antenna can be protected from a severe use condition.

An eighteenth feature of the present invention is that the communication connector is provided connectable to a remote set for remotely controlling the communication apparatus. Accordingly, use of the communication apparatus is not limited to communication of an operational condition to the outside. The communication apparatus can be used in communication with the remote set.

A nineteenth feature of the present invention is that the communication apparatus is a portable phone. The portable phone can be used in communication of an operational condition, and if necessary, the portable phone is removed from inside of the cover to carry out voice communication or emergency contact or the like.

DETAILED DESCRIPTION OF THE PREFERRED EMBODIMENTS

Figure 3:
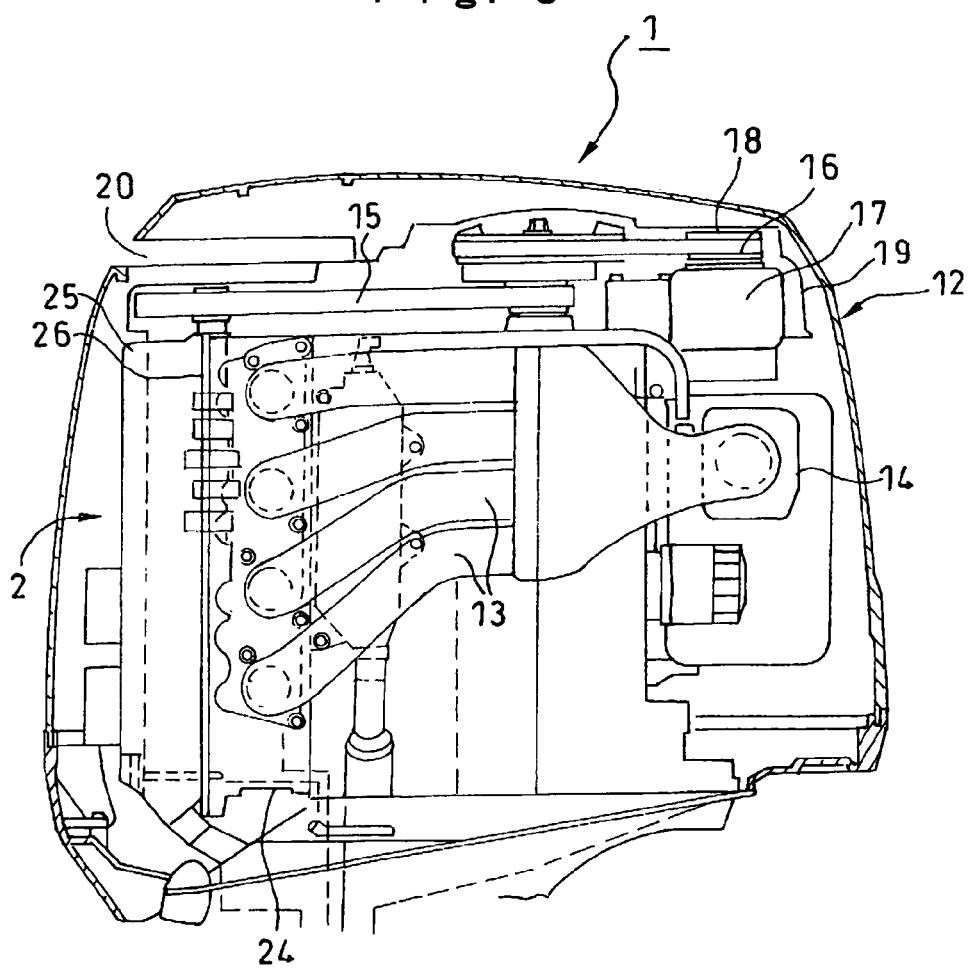
FIG. 3 is a cross sectional view of a substantial part of the outboard motor according to the embodiment of the present invention.
Figure 2:
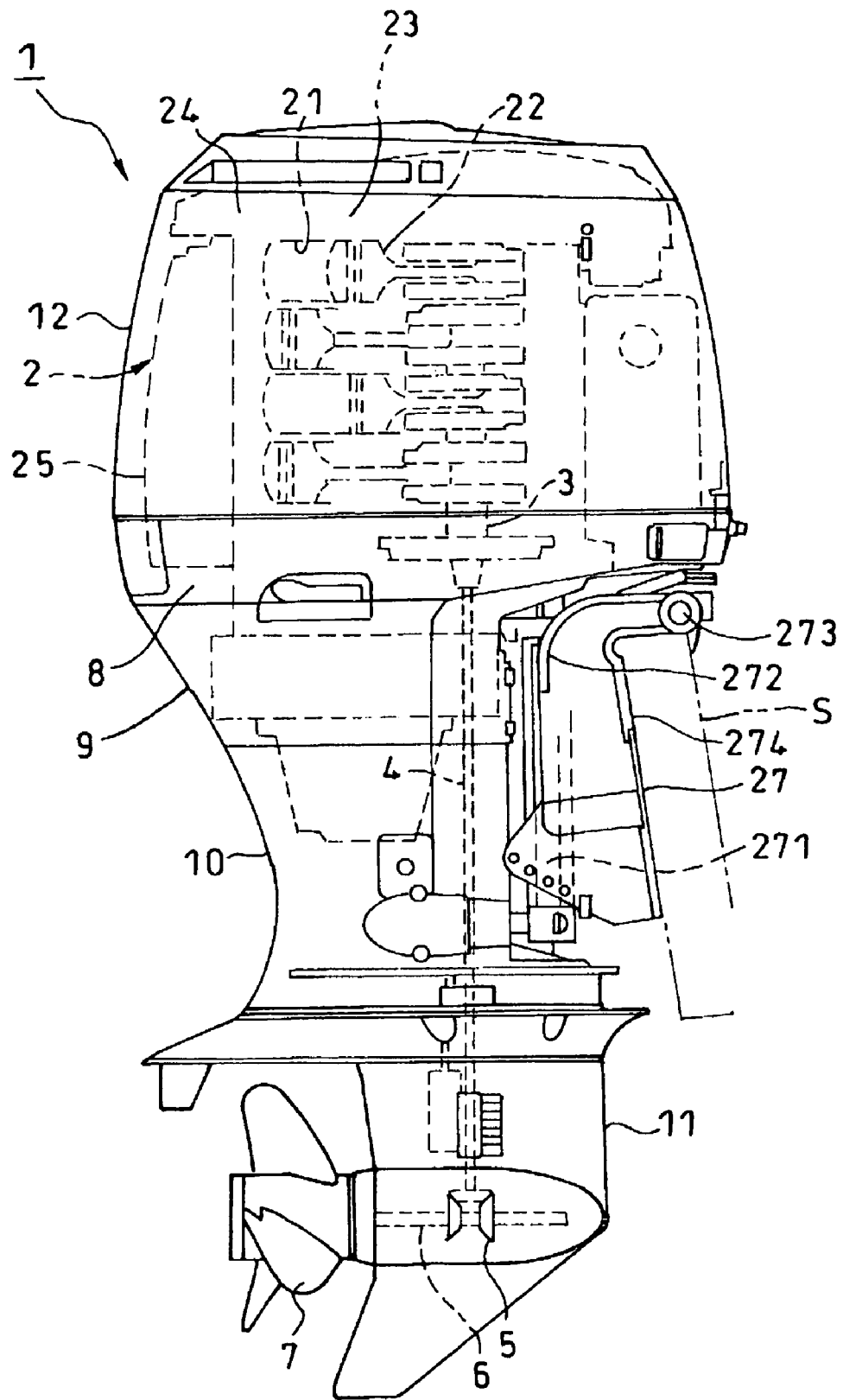
FIG. 2 is a side view of an outboard motor according to an embodiment of the present invention.

The present invention is described in detail with reference to the drawings. FIG. 2 is a right side view of an outboard motor according to an embodiment of the present invention, and FIG. 3 is a cross sectional view of a substantial part of the outboard motor. An outboard motor 1 has a multicylinder four-cycle internal combustion engine 2 mounted thereon. The engine 2 is an engine having a crankshaft 3 which extends up and down, or vertically, and a driving shaft 4 extend downwardly from the crankshaft 3. The driving shaft 4 has a lower end, which is connected via a gear mechanism 5 to a propeller shaft 6. Mounted onto this propeller shaft 6 is a screw, that is, a propeller 7.

A lower portion of the engine 2 is housed in an under case 8, an under cover 9 and an extension case 10, while the gear mechanism 5 and the propeller shaft 6 are housed in a gear case 11. A body of the engine 2, that is, an upper portion of the engine is covered with a detachable engine cover 12. The under case 8, the under cover 9 and the extension case 10 are made of metal. The engine cover 12 is made of a resin.

The engine 2 has four cylinders 21 and pistons 22 arranged in such a manner that the cylinder 21 is laid horizontally. Each of the cylinders 21 is configured by a cylinder block 23 and a cylinder head 24. The cylinder 24 is covered with a cylinder cover 25. An air inlet manifold 13, which extends from the cylinder head 24, is connected to a muffler 14. A cam shaft 26 which protrudes from the cylinder head 24 is connected to the crankshaft 3 with a belt 15. The crankshaft 3 is connected to a shaft 18 of an electric generator 17 with a belt 16. The belts 15 and 16 are covered with a belt cover 19.

The engine cover 12 has an air inlet opening 20 provided at an upper portion thereof. An antenna of a communication apparatus (described later with reference to FIG. 1) is arranged on a top inner surface of the engine cover 12.

An attachment 27 for mounting an outboard motor 1 mounting to a boat S is provided at the outboard motor 1. The attachment 27 includes a first bracket 272 connected to a horizontally swinging axis 271 which extends approximately vertically, and a second bracket 274 provided to be vertically swingable relative to the first bracket 272 by a vertically swinging axis 273. The second bracket 274 is used to fix the outboard motor 1 at a rear portion of the boat S.

Figure 4:
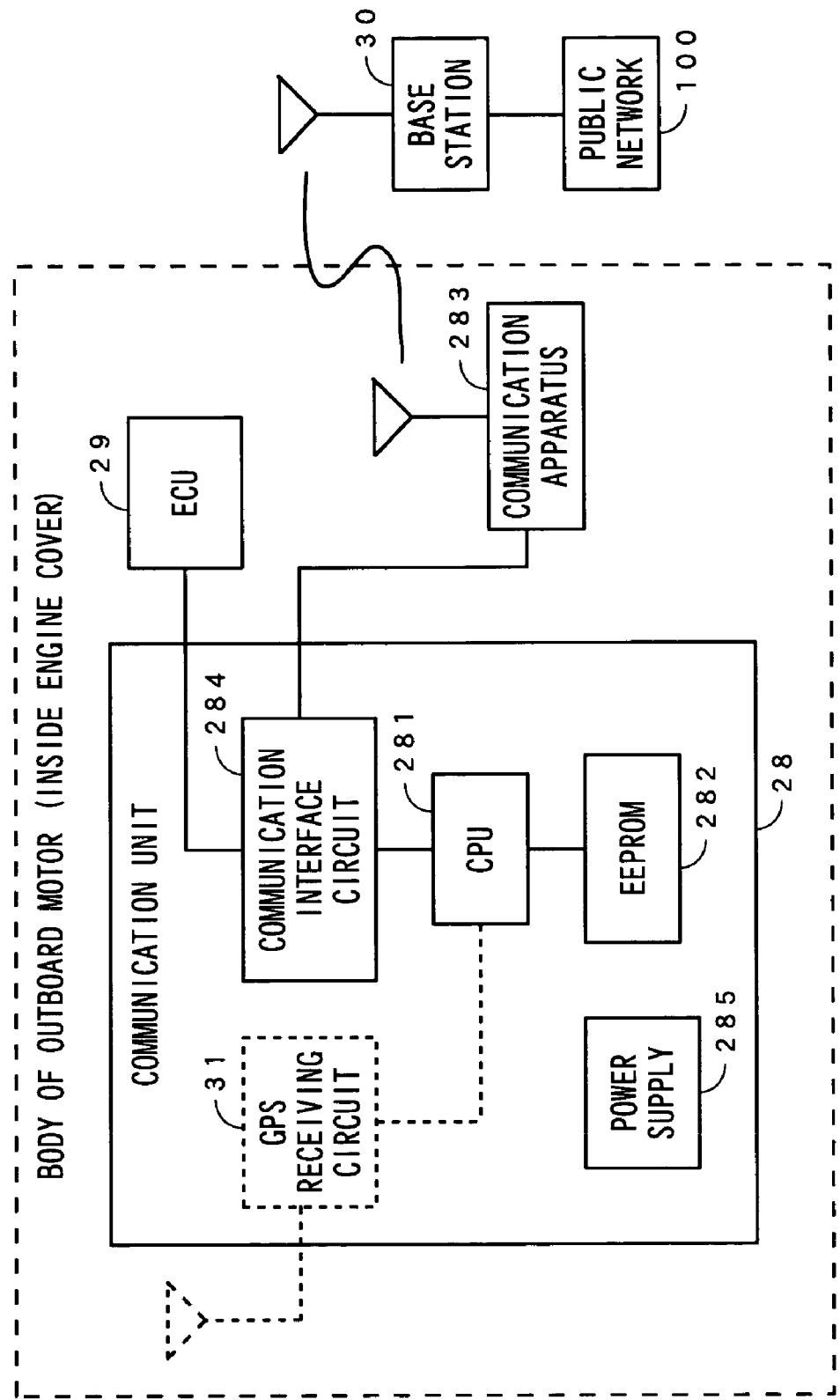
FIG. 4 is a block diagram of a substantial part of a communication apparatus mounted on the outboard motor.

FIG. 4 is a block diagram of a substantial part of a communication system mounted on the above-described outboard motor. A communication unit 28 includes a CPU 281, an EEPROM 282, a communication interface circuit 284 and a power supply 285 for supplying them with power. An ECU 29 is a controller for controlling operation of the engine 2 and functions as an operational condition detecting device for detecting an operational condition of the engine, for example, an amount of the engine oil, a temperature of the engine and the like. The communication interface circuit 284 is connected to the ECU 29, reads information and the like of the detected operational condition of the engine 2, and the information is transmitted from a communication apparatus 283 to a base station 30 via radio waves.

The communication apparatus 283 is data-communication-purpose equipment, which communicates with the outside following instructions from the communication unit 28. Thus, the communication unit 28 and the communication apparatus 283 consist in a radio communication apparatus housed in the engine cover 12 of the body of the outboard motor.

The ECU 29 transmits to the communication unit 28 data detected by various sensors provided in the outboard motor 1. The communication unit 28 transmits condition data of the outboard motor 1 from the communication apparatus 283 to the base station 30 provided in a marina or the like. The base station 30 transmits the data to an office or a shop predetermined as a communication addressee by a public network 100. Instead of the data communication purpose equipment, a portable phone may be used as the communication apparatus 283.

A GPS receiving circuit 31 for receiving a signal of a GPS (Global Positioning System) may be mounted to the outboard motor 1. In this case, a position of the outboard motor 1, that is, a position of the boat with the outboard motor is calculated based on the position information detected by the CPU 281 and the GPS receiving circuit 31 of the communication unit 28.

Figure 1:
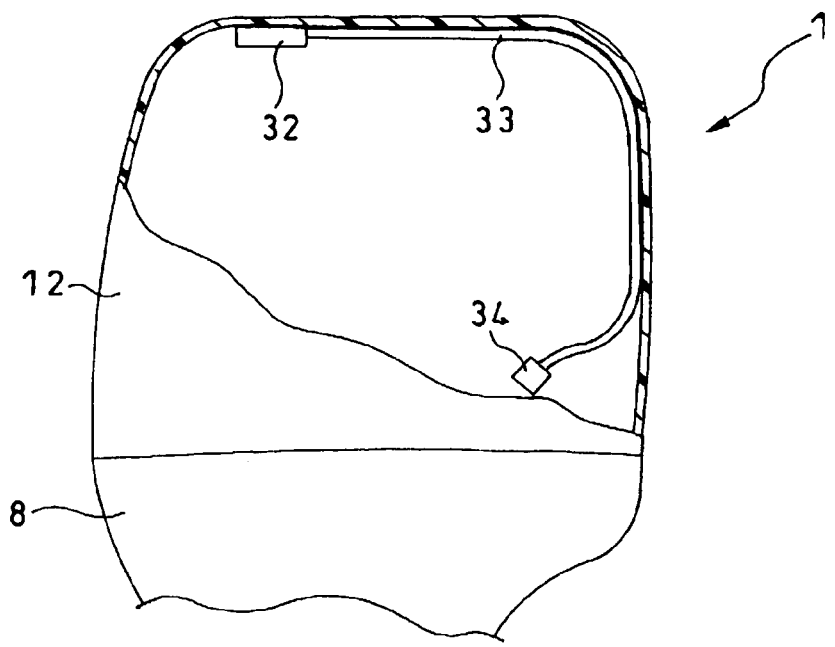
FIG. 1 is a cross sectional view of an engine cover showing a first example of antenna arrangement.

The antenna arrangement for the communication unit 28 and the GPS receiving circuit 31 are described bellow. FIG. 1 is a cross sectional side view of the engine cover 12 of the outboard motor. An antenna 32 of the above-described communication apparatus 283 is fixed to a leftward portion (in FIG. 1) on the top inner surface of the engine cover 12, in other words, at a frontward portion of the boat on which the outboard motor 1 is mounted. The antenna 32 is provided for communication unit 28 and for the GPS receiving circuit 31, respectively. The antenna 32 is prepared, for example, as an antenna module formed by sintering an antenna element with ceramic, and secured to the inner surface of the engine cover 12 by an adhesive agent or the like. A cable 33 run out of the antenna 32 is arranged along the inner surface of the engine cover 12. A connector 34 at one end of the cable 33 is connected with other connector (not shown) elongated to the GPS receiving circuit 31 and the communication unit 28. Since the antenna 32 is mounted on the top of the engine cover 12, it easily captures an artificial satellite in every direction.

The communication unit 28 and the GPS receiving circuit 31 may be provided in an case (not shown) provided to the engine 2, for example, at a lateral portion of the cylinder block 23. Preferably, the above-described cable 33 extends from the engine cover 12 to the connector 34 and is long enough to be connected with the communication unit 28 and the GPS receiving circuit 31 when the engine cover 12 is detached from the body of the outboard motor 1. As the cable 33 has enough length, a group of the engine cover 12 and the antennas 32 and a group of the communication unit 28, the GPS receiving circuit 31 and the body of the outboard motor 1 may be handled separately. In addition, the cable of enough length can accommodate a difference between a vibration of the communication unit 28 and the like and a vibration of the antennas 32 and the like.

Figure 5:
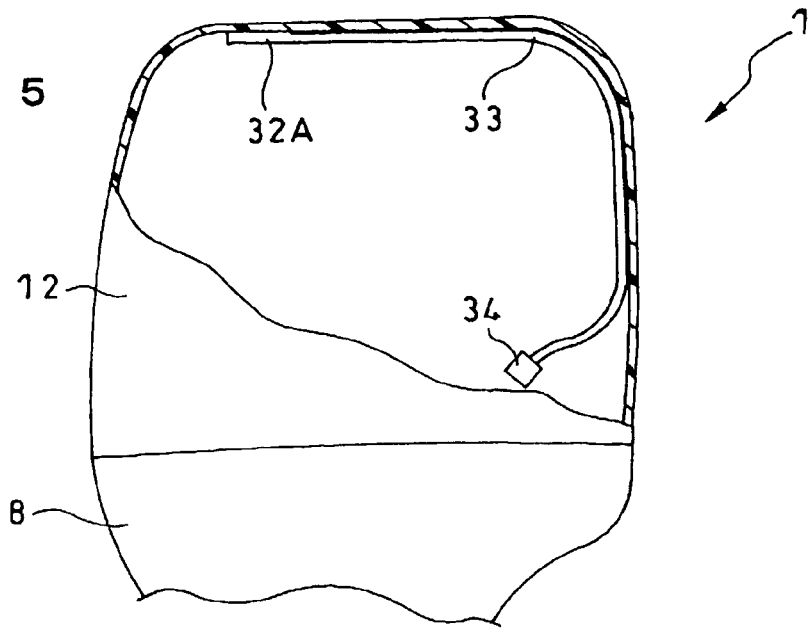
FIG. 5 is a cross sectional view of an engine cover according to another example of antenna arrangement.

FIG. 5 is a cross sectional side view of the engine cover 12, showing second embodiment of antenna arrangement. Like numerals as those in FIG. 1 indicate like portions in FIG. 5. In FIG. 5, an antenna 32A is a sheet-type printed antenna. The above-described antennas 32 and 32A are not fixed directly to the engine cover 12 but may be wrapped with a shock absorbing material and fixed to the inner surface of the engine cover 12 via the shock absorbing material. In place of wrapping with the shock absorber, it may be put the shock absorber between the antennas and the surface of the engine cover 12.

Figure 6:
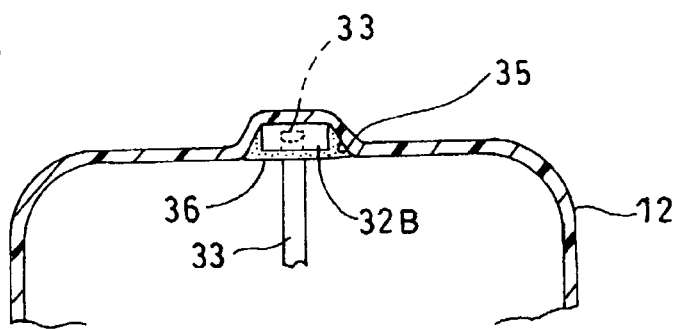
FIG. 6 is a cross sectional view of an engine cover according to yet another example of antenna arrangement.

FIG. 6 is a view of yet another example of antenna arrangement, or cross sectional view of the upper portion of the engine cover seen from the front of the outboard motor, that is, the boat side. Provided on the top inner surface of the engine cover 12 is a recess 35 (protruding portion when seen from the outside), and fixed in this recess 35 is an antenna 32B. The antenna 32B is arranged in the recess 35, and a resin 36 is filled up in the recess 35 in which the resin 36 also serves as adhesive. With this configuration, the antenna 32B is allowed to be kept in the recess 35 by the resin 36 and the resin 36 enables reduction of impact applied to the antenna 32B from the engine cover 12.

The antenna arrangement is not limited to arrangement along the inner surface of the engine cover 12. The antenna arrangement may be such that an antenna is arranged on the top outer surface of the engine cover 12, the cable 33 is arranged from this top outer surface and along the lateral outer surface, the end of the cable 33 with the connector 34 is pulled into the inside of the engine cover 12 through an opening formed in the engine cover 12. In this arrangement, the antennas and cable 33 may be covered with a partial cover from the outside. The opening for passage of the cable 33 is surely sealed with waterproof means such as a rubber bush and the like.

Since a communication apparatus is provided inside of an engine cover, and antennas are mounted on the outboard motor per se or substantially directly, even if the outboard motor is attached to a finished goods or a boat completely built, it is not necessary to route a cable on the deck board of the boat, which results in noise reduction. Further, such a configuration presents no problem in working on the deck board. Positioning between the communication apparatus and the antennas, and their positioning with the outboard motor can be determined in advance. Accordingly, it becomes possible to recognize in advance or take proactive measures against the interference of the outboard motor including an engine with the communication apparatus and the antennas, and an operational malfunction. Since the communication apparatus and the antennas are housed inside of the engine cover, they can be protected from water, and their appearance is enhanced.

Figure 7:
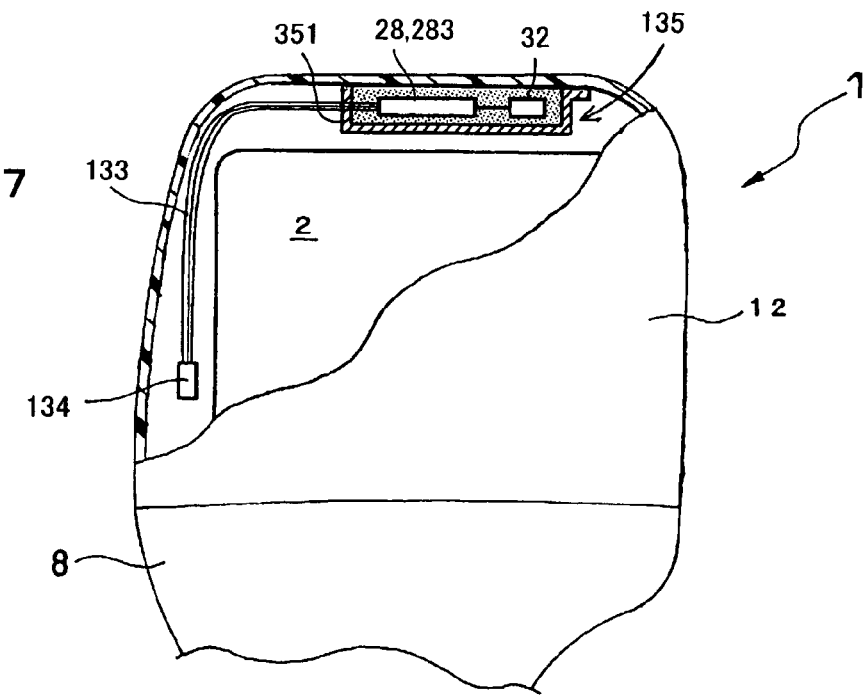
FIG. 7 is a cross sectional view of an engine cover showing a second example of antenna arrangement.

FIG. 7 is a cross sectional view of a substantial portion of the outboard motor, showing the second example of the communication apparatus and antenna arrangement. In FIG. 7, an assembly 135 including the communication unit 28, the communication apparatus 283 and the antenna 32 is arranged in a space between the top of the engine 2 and the top inner surface of the engine cover 12. The assembly 35 is housed in a case 351, and the case 351 is then attached to the top inner surface of the engine cover 12 by appropriate fixing means such as adhesive bonding or screwing. A wiring harness 133 is pulled out of the assembly 135. Attached to an edge of the wiring harness 133 is a connector 134 for connection with the ECU 29 and the like.

Figure 8:
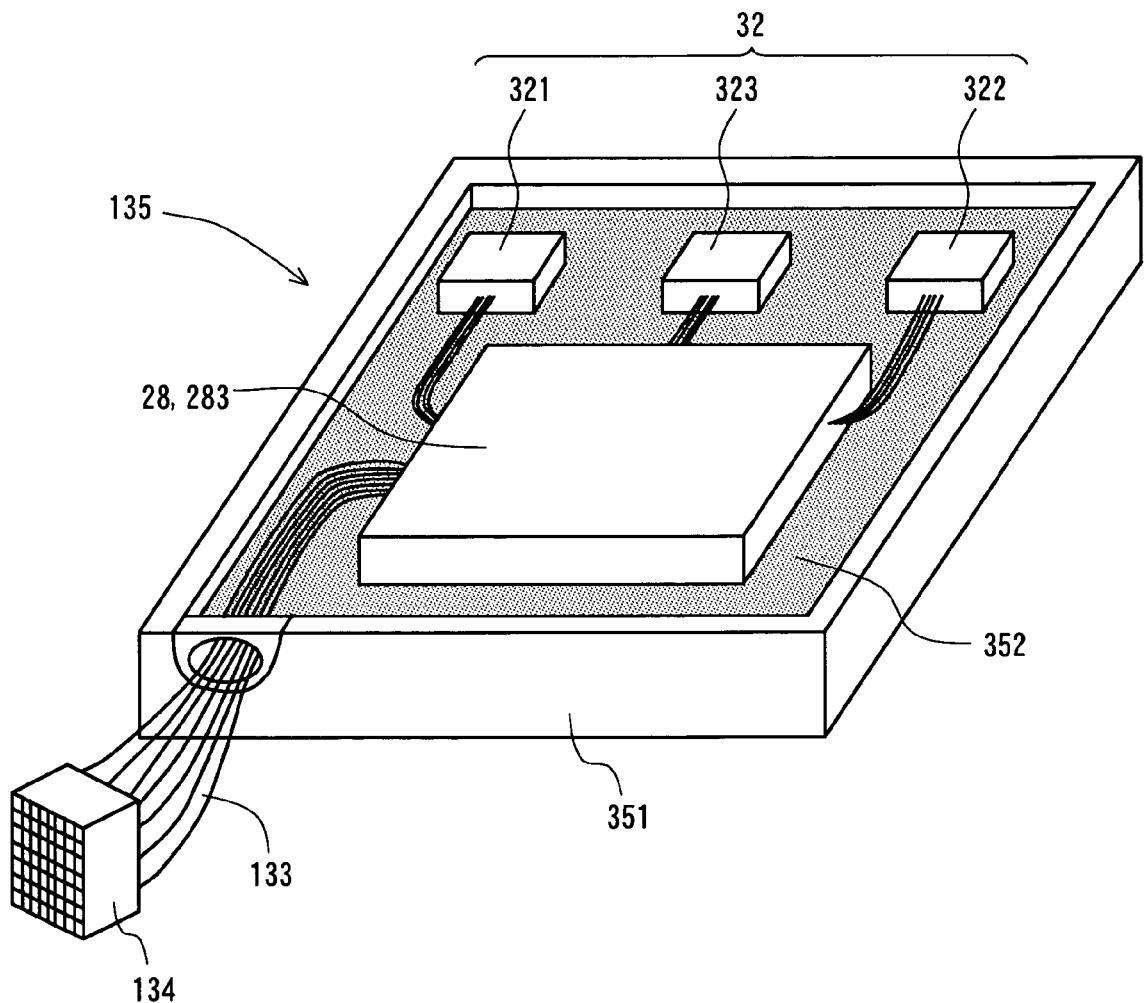
FIG. 8 is a perspective view of the assembly.

FIG. 8 is a perspective view of the assembly 135. The assembly 135 includes the communication unit 28, the communication apparatus 283 and the antennas 32 arranged in the case (container) 351 and a shock absorber 352 filled in the case 351 for fixing them. In FIG. 8, the communication unit 28, the communication apparatus 283 and the antennas 32 are indicated by solid lines at it is exposed to the air. As is clear from FIG. 7 and FIGS. 9A, 9B which is described later, they are entirely covered with the shock absorber 352 and held floating in the case 351 without being in direct contact with the case 351. The shock absorber 352 may be made of a gel agent for potting of an electric/electronic device. Preferably, the gel agent has a shock absorbing function as well as a heat dissipating effect. For example, used as a gel agent may be a thermosetting silicone gel for heat dissipating (SE4445CVA/B, Toray Dow Coning Silicone Co., Ltd.) or a transparent gel for electric/electronic potting/molding (KE1051/1052FE53, Shin-Etsu Silicone Co., Ltd.).

The antennas 32 are communication antennas 321 and 322 and a GPS antenna 323. Each of them is a module formed by sintering an antenna element by ceramic. The communication antennas 321 and 322 utilize antenna diversity, and an antenna having more excellent sensitivity out of them is selectively used as appropriate. The assembly 135 may include an ECU 29 for controlling an operation of the engine.

Figure 9A:
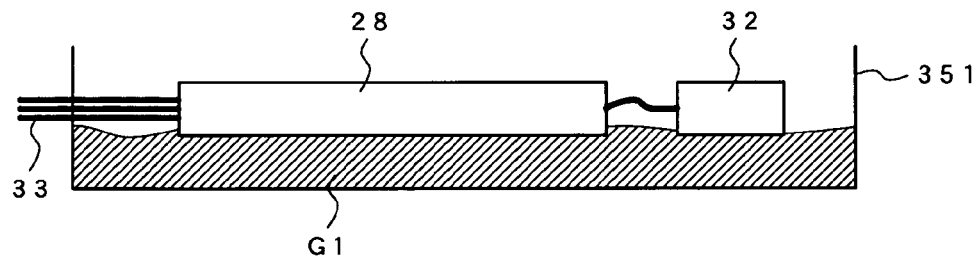
FIG. 9A is a cross sectional view of the assembly showing the communication unit which is laid on the shock absorber.
Figure 9B:
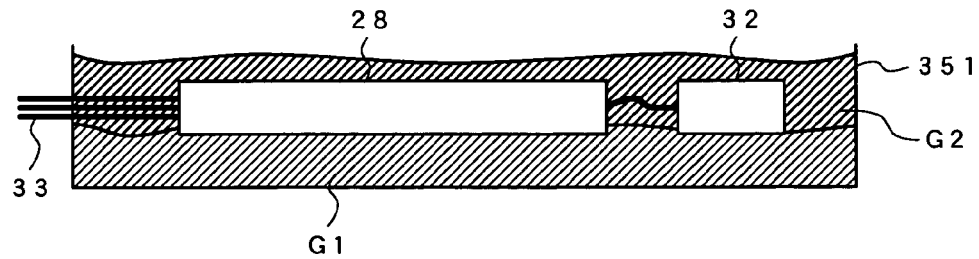
FIG. 9B is a cross sectional view of the assembly showing the communication unit which is sandwiched with the shock absorber.

FIGS. 9A and 9B are cross sectional views of the assembly 135 for describing the procedure of forming the assembly 135. As shown in FIG. 9A, the gel agent G1 as the shock absorbing member 352 is poured in the case 351, above which the communication unit 28 and the antennas 32 are arranged. Then, as shown in FIG. 9B, a gel agent G2 is poured in the case 351 to cover the communication unit 28. These gel agents are solidified at normal temperatures. Accordingly, the communication unit 28 and the like are vertically sandwiched by the gel agents G1 and G2 and are fixed floating in the case 351.

Figure 10:
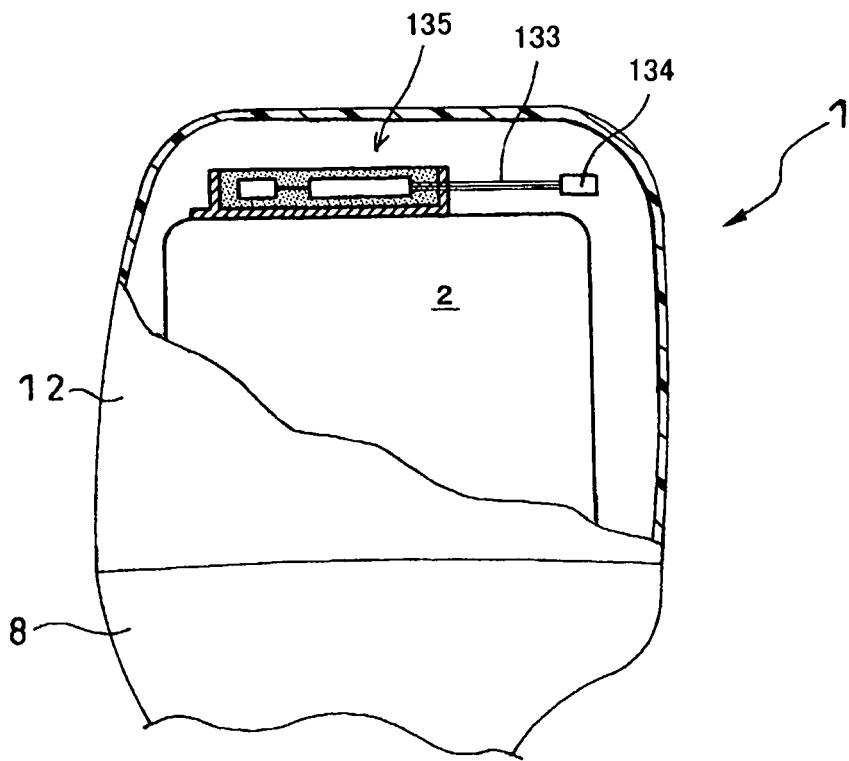
FIG. 10 is across sectional view of an engine cover showing a third example of antenna arrangement.

FIG. 10 is a cross sectional view of a substantial portion of an outboard motor, showing an another example of arrangement of the assembly 135 in the outboard motor. In FIG. 10, the assembly 135 is disposed above the air inlet manifold 13 (FIG. 3) in the upper portion of the engine 2. With such a configuration, the case 351 may be formed independently from other components of the engine 2 to be mounted on the engine or may be formed integral with the air inlet component of the engine 2 by using a resin or the like. Since the assembly 135 is mounted onto the engine 2, the wiring harness. 133 can be connected to sensors and the like at the engine 2 in a state where the engine cover 12 is completely removed from the body of the outboard motor 1, thereby achieving handling ease in maintenance or the like.

In the above-described embodiment, the assembly 135 is attached onto the top inner surface of the cover 12 or on the top of the engine 2. However, these are not for limiting the present invention. The assembly 135 has only to be fixed to a space surrounded with the cover 12 via a shock absorber such as a gel agent and the like. For example, the assembly 35 may be fixed to the lateral inner surface of the cover 12 or the lateral surface of the engine via a shock absorber. Arrangement of the ECU, the communication unit and antennas is not limited to such that they are entirely covered with a shock absorber such as a gel agent and the like. At least only the antennas have to be fixed with the cover via a shock absorber.

As mentioned above, since the ECU, the communication unit, the antennas and the like are kept floating in a case with being entirely covered with gel agents, an excellent shock absorbing effect can be achieved.

Figure 11:
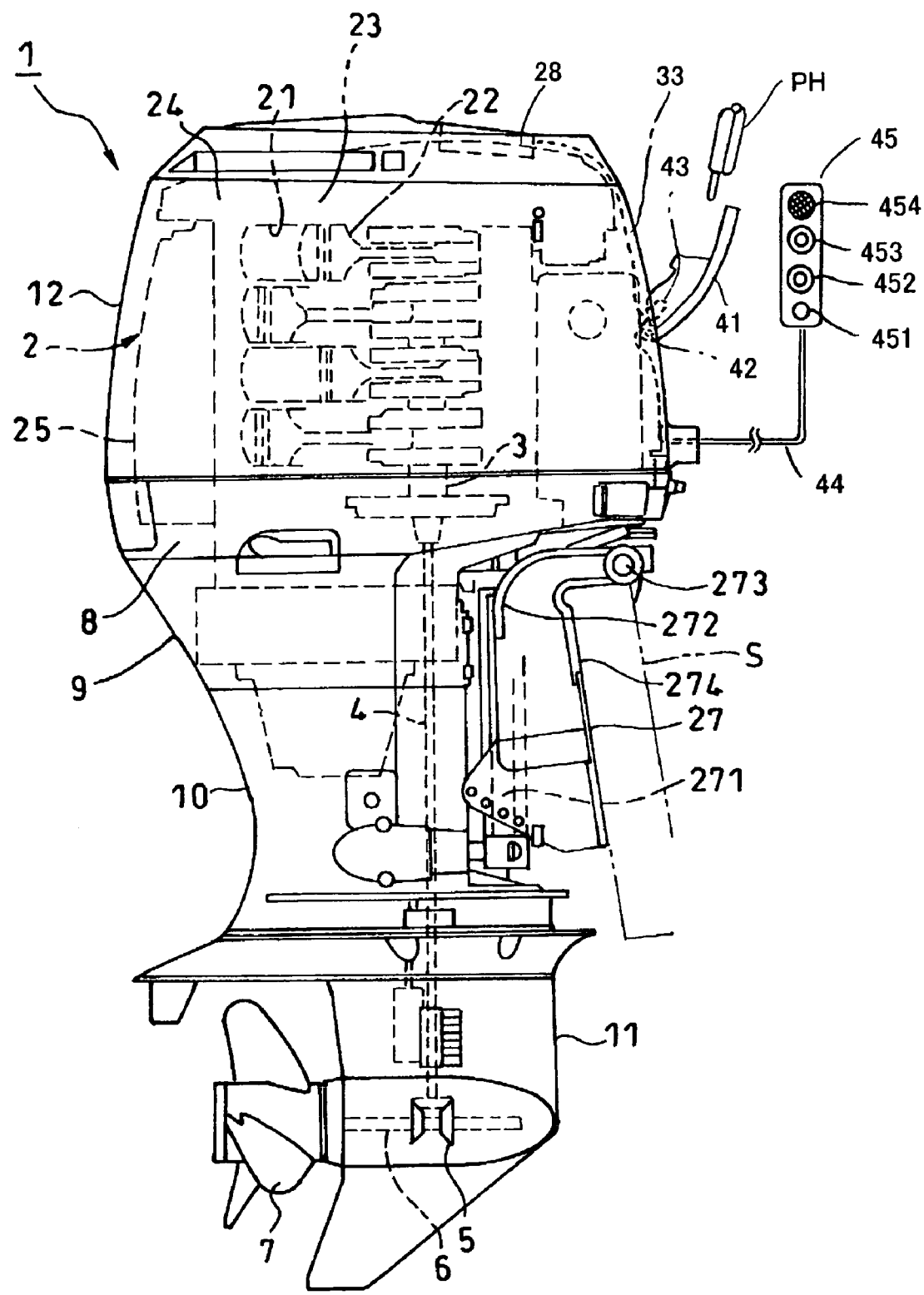
FIG. 11 is across sectional view of an engine cover showing an outboard motor including a communication unit housing.

FIG. 11 is a right side view of an outboard motor according to an embodiment in which a housing is provided for containing the communication apparatus accessibly from outside. Identical or similar portion to the portion of the outboard motor described related to FIGS. 2 and 3 are represented by identical reference sign, and description related to these portions is omitted to avoid repetition.

Arranged on the top inner surface of the engine cover 12 is a communication unit 28 including an antenna. A communication apparatus housing portion 41 is provided on the rear portion of the engine cover 12, that is, on the boat-side wall surface of the engine cover 12. The communication apparatus housing portion 41 is configured to accommodate a portable phone PH, for example, and is supported by the engine cover 12 so as to be pivotable on a pivot 42. As described later, since the communication apparatus housing portion 41 is made pivotable, it opens out, which facilitates insertion and withdrawal of a portable phone PH which is to be housed therein.

In order to protect a communication apparatus housed in the communication apparatus housing portion 41 from vibrations and water, the communication apparatus housing portion 41 has a waterproof structure and a shock absorbing structure. In other words, a sealing member or material for waterproof and shock absorbing effects (not shown) is provided on a surface where the communication apparatus housing portion 41 fits into the engine cover 12. In FIG. 11, the communication apparatus housing portion 41 is opened out around the pivot 42 in such a manner that a portable phone PH is detachable from the communication apparatus housing portion 41. Provided at the bottom of the communication apparatus housing portion 41 is a communication connector 43 which can be connected to an external connection terminal of the portable phone PH. As a cable 33 drew from the communication unit 28 is connected to the communication connector 36, the communication unit 28 and the portable phone PH housed in the communication apparatus housing portion 41 are connected each other.

The cable 33 connected to the communication connector 43 can be extended to the outside of the engine cover 12. An end of the extended portion 44 of the cable 33 pulled to the outside may be connected to a remote controller 45 so that the portable phone PH can be controlled remotely. The remote controller 45 may be provided with an LED 451 for transmission/reception display, a calling button 452, a call end (off) button 453 and a speaker/microphone 454 thereon. These function buttons are not all that are provided in the remote controller 45. Other functions required for remote control of the portable phone PH may be provided optionally.

The extended portion 44 of the cable can be set long enough to place the remote controller 45 near a board pilot. An intermediate connecting section is provided at an optional location between the remote controller 45 at the extended portion 44 of the cable and the engine cover 12. The remote controller 45 is made detachable at this intermediate connecting section, and only when remote control is necessary, the remote controller 45 can be connected to the engine cover 12. Connection between the remote controller 45 and the portable phone PH is not limited to a fixed line such as the cable 33, the extended portion 44 or the like, but is established by radio waves by using a well known near field radio frequency communication technology.

Figure 12:
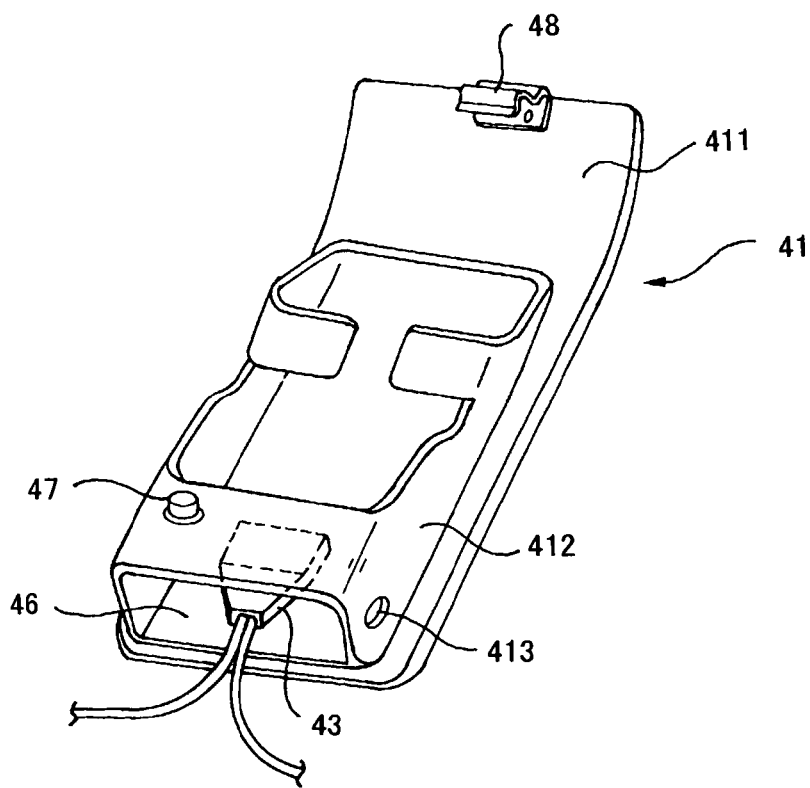
FIG. 12 is a perspective view of the communication unit housing.

FIG. 12 is an enlarged perspective view of the communication apparatus housing portion 41. In FIG. 12, the communication apparatus housing portion 41 includes a lid portion 411 and a communication apparatus holding frame 412. The lid portion 411 is a part of the engine cover 12, and an outer shape, or a profile, of the lid portion 411 is such that it fits into opening of the engine cover 12 into which the lid portion 411 is engaged. A material of the lid portion 411 is preferably a resin that is the same as or equivalent to the material of the engine cover 12. As described above, the lid portion 411 is provided with a shock absorber. Preferably, the communication apparatuses holding frame 412 is also made of a material having a shock absorbing function, or has a shock absorbing rubber sheet attached to a surface which is in contact with a portable phone PH housed in the frame 412.

Arranged in the center of the bottom of the communication apparatus holding frame 412 is a communication connector 43, and a space 46 is formed between both sides of the communication connector 43 and the communication apparatus holding frame 412. The space 46 is provided for placing an antenna of the portable phone PH housed in the communication apparatus holding frame 412, in the space 46 without collision with the communication connector 43. The communication apparatus holding frame 412 has a hole 413 formed at a lateral portion thereof for receiving a pin of the above-mentioned pivot 42.

The communication apparatus holding frame 412 may be provided with an ejector button 47. It is desirable that the external connection terminal of the portable phone PH connected to the communication connector 43 is locked by adopting a spring lock structure. With this structure, the ejector button 47 is pushed to release the spring biased in the locking direction.

Provided at the top inner side of the lid portion 411 is a hook 48 for fixing the lid portion 411 to the engine cover 12. This hook 48 is such that blade spring is bent to be engaged with a hook holder (not shown) provided to the engine case 12. Such a locking mechanism of the lid portion by the hook and hook holder combination may adopt a conventional and widely used mechanism for retaining a lid portion.

Since the communication apparatus housing portion 41 is one-piece of the lid portion 411 and the communication apparatus holding frame 412, once the lid portion 411 is opened, the communication apparatus holding frame 412 is jutted out from the engine cover 12, thereby achieving extremely good accessibility to the portable phone PH housed therein, or insertion/withdrawal and push-button operation of the portable phone PH.

Since a communication apparatus such as a portable phone or the like is provided inside of an engine cover, even if an outboard motor is attached to a boat completely built, it is not necessary to route a cable on the deck board of the boat, and there occurs less noise. Further, there occurs no problem due to obtrusive cable in working on the deck board. Positioning between the communication apparatus and the antenna, their positioning with the outboard motor are determined in advance. Since the portable phone is housed in the engine cover, it can be protected from water, and its appearance is enhanced.

In the above described embodiment the propulsion unit which has a propeller or a screw is shown. However, instead of the screw, any other means as a part of the propulsion unit, such as a jet propulsion means.

In the present embodiment, a portable phone PH is used as an example of a communication apparatus 283. However, instead of the portable phone PH, a packet communication apparatus may be housed in a communication apparatus housing portion 34.

As is apparent from the above description, the present invention can present the following effects:

(1) Since the radio communication apparatus and the antenna is fixed to the cover, it can resist severe vibrations of the outboard motor.

(2) Since the controller and the radio communication apparatus are arranged in the vicinity of the antenna in the outboard motor thereby to shorten cable wiring or routing, it is possible to reduce noise that may occur in cable wiring or routing.

(3) Since positioning between the engine which may cause noise and the antenna, and the communication apparatus is fixed, it is possible to check noise effects and take measures against noise before an outboard motor is mounted on a boat.

(4) Since the antenna is arranged along a surface of the cover, it does not interfere with another component, thereby enhancing their handleability.

(5) Since the antenna is attached to the inner surface of the cover, the appearance is enhanced and it is possible to protect the antenna from a severe use condition such as getting wet.

(6) Since the radio communication apparatus and an antenna can be connected by a connector while a cover is removed, it is possible to separately handle a combination of the outboard motor body and the communication apparatus and a combination of the cover and the antenna. Further, since cable wiring is set sufficiently long, it is possible to accommodate a difference of vibrations between the communication apparatus and the antenna. That is, a vibration of the one has little effect on that of the other.

(7) Since the controller, the radio communication apparatus and an antenna are covered with a gel agent and held floating in a container, it is possible to obtain excellent shock absorbing and heat dissipating effects.

(8) Since the controller, the radio communication apparatus and the antenna can be handled as separate modules, cable wiring thereof is simplified.

(9) Since the controller, the radio communication apparatus and the antenna are fixed to the engine body, it is possible to simplify cable wiring and to achieve shock absorbing and heat dissipating effects by a gel agent.

(10) Since the communication apparatus can be covered with the cover of the internal combustion engine, the appearance of the outboard motor can be kept enhanced, and measures against noise can be easily taken. In particular, it is possible to check and take measures against the noise when assembling the outboard motor separately.

(11) The communication apparatus can be readily connected to the operational condition detecting device.

(12) It is possible to provide an outboard motor with excellent appearance, which accommodates the communication apparatus by using a resin material with ease of molding and coloring.

(13) The communication apparatus can be used by remote control. Since the antenna of the communication apparatus can be entirely housed in a resin cover, the appearance thereof is enhanced and the antenna is protected from a severe use condition.

(14) A portable phone can be used to automatically transmit information on an operational condition, and if necessary, a passenger can remove the portable phone from inside of the cover to transmit necessary information or carry out emergency contact or the like.

What is claimed is:

1. An outboard motor having a body which includes a propulsion unit and an internal combustion engine for driving the propulsion unit, and a cover for covering the internal combustion engine detachably, comprising:
    a controller for controlling the internal combustion engine and a radio communication apparatus connected to the controller, both of which are housed inside of the cover;
    an antenna of the radio communication apparatus which is mounted on the outboard motor; and
    an operational condition detecting device for detecting an operational condition of the internal combustion engine, wherein
    the radio communication apparatus transmits to an outside an operational condition detected signal output from the operational condition detecting device.

2. The outboard motor according to claim 1, wherein the antenna is fixed in the cover.

3. The outboard motor according to claim 1, wherein the antenna is fixed to a surface of the cover.

4. The outboard motor according to claim 1, wherein the antenna is disposed along a surface of the cover.

5. The outboard motor according to claim 1, wherein the cover is made of a resin and the antenna is attached to an inner surface of the cover.

6. The outboard motor according to claim 1, wherein a cable is provided extending from the antenna to the radio communication apparatus and the cable is run along the surface of the cover.

7. The outboard motor according to claim 1, wherein the controller and the radio communication apparatus are mounted onto the body, and a connector is provided for connecting/disconnecting the radio communication apparatus and the antenna while the cover is detached from the body.

8. An outboard motor having according to claim 1, wherein the cover is made of a resin, and
    out of the controller, the radio communication apparatus and the antenna, at least the antenna is fixed to the inside of the cover via a shock absorber.

9. An outboard motor according to claim 8, wherein an antenna is covered with a gel agent as a shock absorber.

10. The outboard motor according to claim 9, further comprising a container which is fixed in the cover, wherein the radio communication apparatus and the antenna are covered entirely with a gel agent that is filled in the container.

11. The outboard motor according to claim 10, wherein the controller is covered entirely with a gel agent that is filled in the container, together with the radio communication apparatus and the antenna.

12. The outboard motor according to claim 10 or 11, wherein the container is fixed to an inner surface of the cover.

13. The outboard motor according to claim 10 or 11, wherein the container is fixed to the internal combustion engine.

14. The outboard motor according to claim 1, further comprising a communication apparatus housing portion for inserting the radio communication apparatus into the cover in such a manner that the radio communication apparatus is accessible from an outside.

15. The outboard motor according to claim 14, wherein the communication apparatus housing portion includes a lid portion which is a part of the cover, and a holding member for holding the communication apparatus inside the cover, the holding member being connected to the lid portion so as to be housed inside the cover, and
    the lid portion is retractably pivoted about the cover.

16. The outboard motor according to claim 15, wherein the holding member has a shock absorbing function for protecting the communication apparatus housed in the communication apparatus housing portion.

17. The outboard motor according to claim 15, wherein the cover and the lid portion of the communication apparatus housing portion are made of a resin.

18. The outboard motor according to claim 14, wherein the communication apparatus housing portion is provided with a communication connector which is compatible with a connection terminal of the communication apparatus so as to connect the communication apparatus housed in the communication apparatus housing portion and the operational condition detecting device.

19. The outboard motor according to claim 18, wherein the communication connector is provided connectable to a remote controller for remotely controlling the communication apparatus.

20. The outboard motor according to claim 1 or 14, wherein the communication apparatus is a portable phone.

* * * * *